Nov. 28, 1950 O. W. TOWNER 2,531,713
LINE-TUNED OSCILLATOR
Filed Nov. 5, 1945
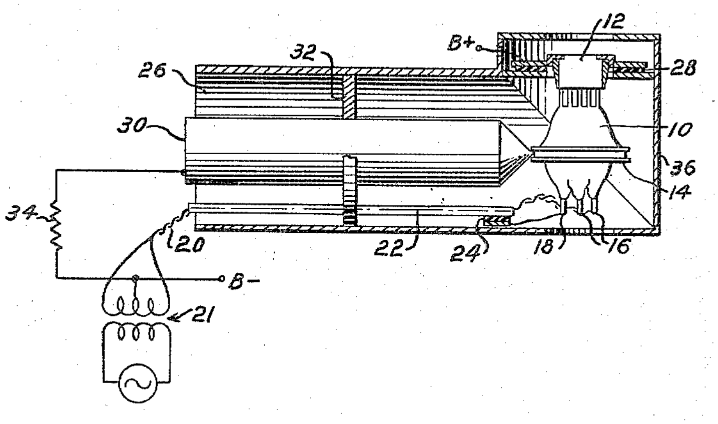
INVENTOR.
Orrin W. Towner
BY
Ralph L. Chappell
ATTORNEY Patented Nov. 28, 1950

2,531,713

UNITED STATES PATENT OFFICE 2,531,713

LINE-TUNED OSCILLATOR

Orrin W. Towner, Anchorage, Ky., assignor to the United States of America as represented by the Secretary of the Navy Application November 5, 1945, Serial No. 626,847

10 Claims. (Cl. 250—36)

This invention relates to line-tuned oscillators, amplifiers or the like.

Power oscillators have in the past included coaxial lines for frequency control. The vacuum tubes used frequently have had cylindrical anodes, and more generally have had an axis of symmetry. From a consideration of lengths of conductor between the vacuum tubes and the coaxial tuning line, the vacuum tube axis has heretofore been arranged at right angles to the coaxial tuning line with its axis passing approximately midway between the ends of the vaccum tube. Little attention has been given to the transition between the tuning line and the vacuum tube, with the result that field discontinuities have limited the minimum length of effective tuning line.

It is the object of the present invention to improve coaxial line-tuned oscillators, amplifiers or the like, in which the vacuum tube axis is arranged at right angles to the tuning line.

According to the present invention the vacuum tube, having its axis perpendicular to that of the coaxial tuning line and its length substantially included between the diametral limits of the external conductor of the coaxial line, is partly enclosed in a cylinder connected to that external conductor, the cylinder axis coinciding with the axis of the vacuum tube. This arrangement is especially effective in power oscillators wherein the tuning range and minimum line length are important. The arrangement yields increased efficiency and improved stability.

The invention will be better understood from the following detailed disclosure of a preferred embodiment thereof in which the single figure is the combined diagrammatic section and wiring diagram of one embodiment thereof.

In the drawing, there is shown an oscillator, including triode 10 having anode 12, grid 14, filament terminals 16 and filament center-tap 18 hereafter termed a cathode. Filament 16 is energized through twisted leads 20 enclosed within and having appreciable capacity to cathode line 22, leads 20 being connected to filament transformer 21. Line 22 is maintained at the R.-F. potential of cathode 18 at its end nearest the vacuum tube, either by direct connection or, because of the grid-bias arrangement, through blocking capacitor 24 as shown.

As previously mentioned the illustrated oscillator is tuned by means of a coaxial line. In the present instance that line is an R.-F. circuit between the plate and the grid with the cathode line arranged intermediate the two at a radial position determined by the desired feedback ratio. Plate 12 is coupled to plate line 26 through blocking capacitor 28 and grid 14 is directly connected to grid line 30. The effective length of the tuning line can be varied by moving shorting ring or disc 32. This ring connects lines 22, 26 and 30 all at an equal distance from triode 10. It is evident that other circuit arrangements can be adopted in this oscillator, as by directly connecting cathode 18 to line 22 and incorporating blocking capacitor 24 in shorting ring 32 so that only cylinders 26 and 30 would be directly connected to each other by ring 32. Grid bias is developed in resistor 34 connected between any part of the coaxial line and the center-tap of filament transformer 21. The plate power supply is connected between plate 12 and the center-tap of filament transformer 21.

The oscillator described is purely illustrative. Other arrangements of coaxial tuning lines and oscillators can similarly be arranged relative to a vacuum tube with the axis of the tube perpendicular to the axis of the tuning lines. For example, see copending application Serial No. 692,361, filed August 22, 1946, for "Line-Tuned Oscillators," filed by Paul S. Lansman. In such oscillators as well as in coaxial line tuned power amplifiers it is of great advantage to enclose the vacuum tube within a cylindrical transition piece connected (at least for R.-F.) to the external conductor of the tuning line. Thus, as shown, such a cylindrical shield 36 is coaxial with vacuum tube 10 and forms a right-angle joint with conductor 26 of the tuning line. It is particularly important that the anode, which has a long exposed surface, be associated with such cylindrical shield.

It is not necessary that the transition piece be perfectively cylindrical, but it is important that it be generally symmetrical with the axis of the vacuum tube that it partly encloses.

Modifications and changes can be made in this invention without departing from the spirit and scope thereof.

What is claimed is:

1. The combination of a coaxial tuning line, and a vacuum tube disposed within said line and arranged with the longitudinal axis of symmetry of said tube perpendicular to that of said line, said axes being coplanarly disposed.

2. The combination comprising a coaxial line, an electron discharge tube mounted within said line and arranged with the longitudinal axis of symmetry of said tube perpendicular to that of said line, said axes being coplanarly disposed, and tuning means located within and adapted to cooperate with said coaxial line to provide a tunable circuit for said tube.

3. The combination comprising a section of coaxial transmission line, an electron-discharge tube having an axis of symmetry perpendicular to that of said section of line, and anode, cathode and grid elements, means connecting said anode element to the outer conductor of said line, means connecting said grid element to the inner conductor of said line, a conductive tubular member having the longitudinal axis thereof parallel to the longitudinal axis of said section of line and disposed between said inner and outer conductors of said line section, and means connecting said cathode element to said tubular member.

4. The combination as defined in claim 3 wherein said conductive tubular member is at a radial distance from said inner conductor corresponding to a desired amount of feedback.

5. The combination comprising a section of coaxial transmission line, an electron-discharge tube having anode, cathode and grid elements and an axis of symmetry perpendicular to that of said section of line, means connecting said anode element to the outer conductor of said line, means connecting said grid element to the inner conductor of said line, said outer conductor having an enlarged-diameter portion substantially enclosing said electron-discharge tube, whereby said section of line is adapted to provide a tuned circuit for said tube effectively to shield said tube, a conductive tubular member having the longitudinal axis thereof parallel to the longitudinal axis of said section of line and disposed between said inner and outer conductors of said line section, and means connecting said cathode element to said tubular conductor thereby providing a feedback connection to said tuned circuit.

6. The combination comprising an electron-discharge tube having anode, cathode and grid elements, means including a tuned section of transmission line connected to said anode element and connected to said grid element providing a resonant circuit for said tube, said tuned section of line being adapted also to provide a substantially enclosed conductive closure for said tube, a conductive tubular member included within said closure and disposed with the longitudinal axis thereof parallel to the longitudinal axis of said line, said tubular member having a connection to the cathode element of said tube providing feedback to said tuned section of line, whereby, upon energization of said tube, sustained high-frequency oscillations are generated thereby.

7. The combination as defined in claim 6, wherein said anode element is of cylindrical form and has a longitudinal axis disposed substantially perpendicularly to the longitudinal axis of said section of transmission line, said longitudinal axes being coplanar.

8. In a high-frequency oscillator apparatus wherein an electron-discharge tube having an anode, a cathode, a grid and an axis of symmetry passing through said tube is connected to a tunable tank circuit, and wherein the cathode is adapted to be connected to a low-frequency source of heating potential by means of a pair of conductors, the combination comprising a coaxial line section having an axis substantially perpendicular to the axis of symmetry of said tube and including outer and inner conductors connected to said anode, and grid, respectively, said line section being dimensioned to provide a tuned circuit for the electron-discharge tube, a hollow cylindrical conductor having the longitudinal axis thereof substantially parallel to the longitudinal axis of said coaxial line section, said cylindrical conductor being disposed intermediate the outer and inner conductors of said coaxial line section and adapted to provide a substantially field-free region therewithin for the conductors connecting the cathode to the low-frequency source of potential, and means connecting said cathode to saide cylindrical conductor for providing feedback to said tuned circuit.

9. The apparatus as defined in claim 8 wherein said inner conductor is directly connected to said grid by a tapered transition section thereby to provide smooth electrical continuity at the connection.

10. In a high-frequency oscillator apparatus wherein an electron-discharge tube having an anode, a cathode, a grid and an axis of symmetry passing through said tube is connected to a tunable tank circuit, the combination comprising a section of coaxial transmission line having an axis substantially perpendicular to the axis of symmetry of said tube, condenser means connecting the anode of said tube to the outer conductor of said section of line, means directly connecting the grid of said tube to the inner conductor of said section of line, said line section being dimensioned to provide a tuned resonant circuit for the electron-discharge tube, and a cylindrical conductor portion on said outer conductor having an axis substantially parallel to the axis of said tube and substantially enclosing said tube within a region operably coupled to said section of coaxial transmission line.

ORRIN W. TOWNER.

REFERENCES CITED

The following references are of record in the file of this patent:

UNITED STATES PATENTS

| Number | Name | Date |
|---|---|---|
| 2,106,771 | Southworth | Feb. 1, 1938 |
| 2,153,728 | Southworth | Apr. 11, 1939 |
| 2,169,396 | Samuel | Aug. 15, 1939 |
| 2,236,004 | MacLean | Mar. 25, 1941 |
| 2,253,589 | Southworth | Aug. 26, 1941 |
| 2,337,219 | Zottu | Dec. 21, 1943 |
| 2,342,896 | Salzberg | Feb. 29, 1944 |
| 2,404,640 | Lawrence | July 23, 1946 |